S. ADAMS.

Valve Cocks.

No. 4,762. Reissued Feb. 20, 1872.

Witnesses.

Wm Howard

H. L. Perrine

Inventor.

Seth Adams

By J. J. Johnston & Bro his attorneys

UNITED STATES PATENT OFFICE.

SETH ADAMS, OF BOSTON, MASSACHUSETTS, ASSIGNOR OF PART INTEREST TO JOSEPH H. DAVIS, OF PITTSBURG, PENNSYLVANIA.

IMPROVEMENT IN VALVE-COCKS.

Specification forming part of Letters Patent No. 20,314, dated May 25, 1858; reissue No. 4,762, dated February 20, 1872.

*To all whom it may concern:*

Be it known that I, SETH ADAMS, of Boston, in the county of Suffolk and State of Massachusetts, have invented a new and useful Improvement in "Valve-Cocks;" and I do hereby declare that the following is a full, clear, and exact description thereof, reference being had to the accompanying drawing and to the letters of reference marked thereon.

The nature of my invention or improvement is to be found in a peculiar arrangement and application of a coupling-pipe, a valve-seat, disk-valve, and valve-chamber, whereby, when the valve may be raised above the bore of the coupling-pipe and a column of fluid may be passing through the coupling-pipe, such column shall flow through the pipe and the valve-chamber in the line of the axis of the pipe or in a straight line, and enter the valve-chamber at one side and pass out of its bottom, or enter at its bottom and pass out of its side, and through an opening of the valve-seat, whose smallest sectional area shall not be less than the sectional area of the bore of the coupling-pipe, or the column of water passing through the same.

Figure 1:
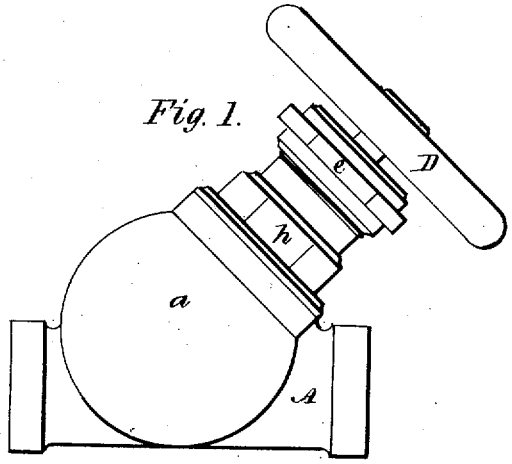
Figure 2:
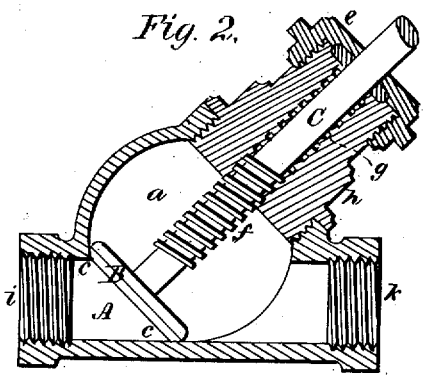
Figure 3:
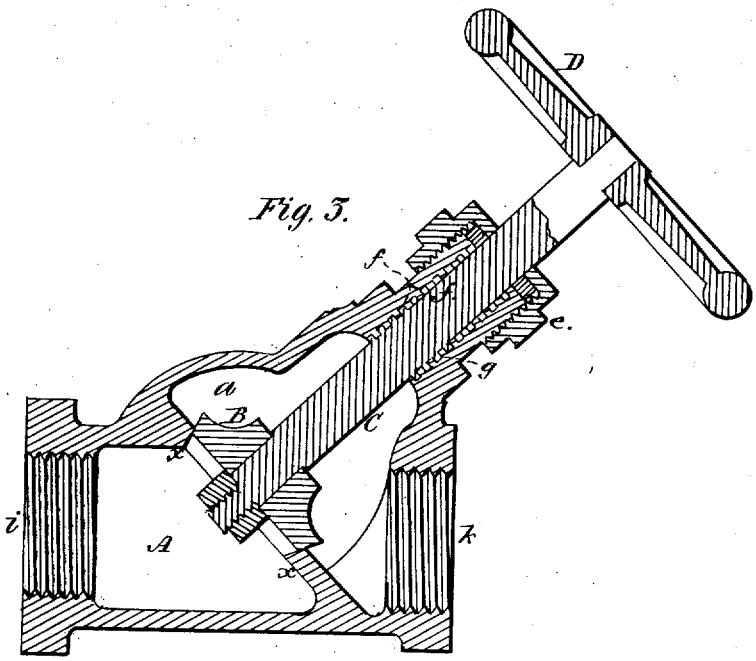

In the accompany drawing, which forms part of my specification, Figure 1 is a side elevation of my improvement in valve-cocks. Fig. 2 is a vertical and longitudinal section of the same. Fig. 3 is a vertical section of my improved valve-cock; the same being a modification of the valve represented in Figs. 1 and 2.

In carrying out this arrangement, the axis of the coupling-pipe should make an acute angle with the valve-disk and its stem, and the coupling-pipe should be so arranged, with regard to the valve-chamber, as to open into the latter, not only at one side of it but at its bottom. Furthermore, the valve-chamber is entirely above the bottom of the bore of the coupling-pipe, and has the valve-seat standing diagonally across the bore, and made of such an area, with respect to the bore, as not to deflect or change the column of fluid out of the line of the axis of the bore when the column of fluid is passing through it, and the valve is raised above the bore of the pipe.

In the drawing, A denotes the coupling-pipe or conduit, as provided with a valve-chamber, *a*, so arranged that the bore of the pipe enters the valve-chamber at its bottom and passes out at one side, or enters at one side and passes out of its bottom, the valve-seat *c c* being arranged around the bore in a plane inclined to the axis thereof. The chamber *a* should be made of sufficient dimensions to allow the disk-valve B to be moved therein to such a height as will carry it entirely above the bore of the coupling-pipe. The rod or stem C of the valve B extends from the middle part of the valve, and has a wheel, D, or its equivalent fixed on its outer end. The said stem, which is cylindrical, works through a stuffing-box, *e*, and has a screw, *f*, adapted to a female screw, *g*, formed in the screw-cap *h* of the valve-chamber *a*. On turning the wheel D backward, the valve B will be raised off its seat. So, by turning forward the wheel D, the valve will be rotated and moved toward its seat. By constructing valve-cocks as represented in Fig. 3, in which the coupling-pipe or conduit A is provided with an inward-projecting flange, as shown at *x*, the area of the valve-disk B may be diminished to any desired degree without deflection or bend of the axis of the fluid in its passage through the coupling-pipe or conduit A.

With my improved disk-valve cock a mass of fluid, when flowing through it and the valve-chamber, will run in line with the axis of the pipe and suffer no material deflection or bend while passing through the valve-seat. As every deflection of a current of fluid tends to increase friction and retard the flow of the current, and, of course, diminish the amount of delivery of the fluid, my improved disk-valve cock has advantages over other kinds of disk-valve cocks in which the direction of movement of the valve is perpendicular to the plane of the seat of such valve.

In constructing disk-valves and applying them to tubes for the conveyance of water or steam, it has generally been customary to arrange them so that they shall have the plane of their seats either parallel to or in line with the axis of the tube of the water or steam pipe, as the case may be, when passing through the valve-chamber and opening of the seat, being made to bend twice or be subjected to two flexures.

I am aware that a sliding as well as a conical gate has been applied within a pipe, and so as to move in a chamber at right angles to the direction of the axis of the pipe. My invention is an improvement on a very different kind of water-cock—viz., one in which the valve is a disk-valve, and is rotated with its stem, and also moved in a direction at a right angle to its seat. Besides this, each end of the coupling-pipe A of my stop-cock is furnished with a coupling-screw, *i* or *k*, having their threads so arranged that on revolving the whole cock in one direction it may be connected or screwed to two leading-pipes, or it may be disconnected or unscrewed therefrom.

I am also fully aware of the stop-cocks described and represented in the specification and drawings of Horatio Allen's application for a patent, withdrawn in July, 1843—particularly that shown in Fig. 3 of the said Allen's drawings—in which the fluid passing from one leading-pipe to the other would have to make three flexures.

I do not claim any of the stop-cocks to which I have had occasion to refer in the explanation of the difference between them and my improved disk-valve cock; but What I do claim is—

An improvement upon them; or, in other words, I claim my improved disk-valve cock, made substantially as described—viz., with one coupling-pipe, a valve-seat, disk-valve, and valve-chamber, arranged and applied together essentially as specified, so that when the valve may be raised above the bore of the coupling-pipe, and a column of fluid may be passing through the said pipe, such column shall flow through the pipe and valve-chamber in a line with the axis of the pipe, or in a straight line, and enter the valve-chamber at one side and pass out of its bottom—or enter at its bottom and pass out of its side, and through an opening of the valve-seat, whose sectional area shall be equal to or greater than that of the bore of the coupling-pipe.

In testimony whereof I have hereunto set my signature this 23d day of December, 1871.

SETH ADAMS.

Witnesses:

WM. HEYWOOD, Jr.,
JULIUS ADAMS.